US009030182B2

(12) United States Patent
Galloway

(10) Patent No.: US 9,030,182 B2
(45) Date of Patent: May 12, 2015

(54) CONTROLLER FOR A DC TO DC CONVERTER, A COMBINATION OF A CONTROLLER AND A DC TO DC CONVERTER, AND A METHOD OF OPERATING A DC TO DC CONVERTER

(75) Inventor: Gavin Galloway, Stepps (GB)

(73) Assignee: Analog Devices, Inc., Norwood, MA (US)

(*) Notice: Subject to any disclaimer, the term of this patent is extended or adjusted under 35 U.S.C. 154(b) by 148 days.

(21) Appl. No.: 13/609,734

(22) Filed: Sep. 11, 2012

(65) Prior Publication Data

US 2014/0070785 A1 Mar. 13, 2014

(51) Int. Cl.

*H02M 3/156* (2006.01)
*H02M 3/158* (2006.01)
*H02M 3/155* (2006.01)

(52) U.S. Cl.

CPC .................................. *H02M 3/1582* (2013.01)

(58) Field of Classification Search

CPC .............. H02M 3/156; H02M 3/1563; H02M 2003/1566; H02M 2003/1557

USPC ................................. 323/282, 284, 285, 351

See application file for complete search history.

(56) References Cited

U.S. PATENT DOCUMENTS 7,327,127 B2 * 2/2008 Ho ................................ 323/271
2010/0134085 A1 * 6/2010 Nishida ......................... 323/285
2012/0161728 A1 6/2012 Chen et al.
2012/0223687 A1 * 9/2012 Liu et al. ....................... 323/271

FOREIGN PATENT DOCUMENTS

WO WO-2014043219 A2 3/2014
WO WO-2014043219 A3 3/2014

OTHER PUBLICATIONS

"International Application Serial No. PCT/US2013/059242, International Search Report mailed Jul. 10, 2014", 3 pgs.
"International Application Serial No. PCT/US2013/059242, Written Opinion mailed Jul. 10, 2014".

* cited by examiner

*Primary Examiner* — Gary L Laxton
(74) *Attorney, Agent, or Firm* — Schwegman Lundberg & Woessner, P.A.

(57) ABSTRACT

A controller for a DC to DC converter, comprising first and second electrically controlled switches and an inductor, wherein placing the first switch in a low impedance state causes a current flow in a first direction through the inductor to increase, and placing the second switch in a low impedance state causes the current flow in the first direction to decrease. The controller can operate a DC to DC converter in a first mode when a current taken by a load supplied by the converter is above a first current threshold, and in a low power mode when the current taken by the load is below the first current threshold, wherein the controller uses information about a switching time of the first switch in the first mode to control a switching time of the first switch in the low power mode.

30 Claims, 15 Drawing Sheets

CONTROLLER FOR A DC TO DC CONVERTER, A COMBINATION OF A CONTROLLER AND A DC TO DC CONVERTER, AND A METHOD OF OPERATING A DC TO DC CONVERTER

FIELD OF THE INVENTION

The present invention relates to a controller for use with a switching DC to DC converter, to a combination of a controller and a switching converter, and to a method of operating a switching converter.

BACKGROUND

Switching converters in which transistor switches are driven between fully on and fully off provide great efficiency improvements over dissipative style converters in which a transistor is used in a linear mode to drop a voltage across the transistor while current flows through the transistor such that a voltage at a terminal thereof, such as an emitter, collector or source or drain of the transistor is held at a desired output voltage.

However switching converters incur switching losses, and these become proportionally more significant as a load current reduces.

SUMMARY OF THE INVENTION

According to a first aspect of the present invention there is provided a controller for a DC to DC converter, the converter comprising a first electrically controlled switch in series connection with an inductor, and wherein placing the first electrically controlled switch in a low impedance state causes current flow in a first direction through the inductor to increase, and placing the first electrically controlled switch in a high impedance state causes current flow in the first direction through the inductor to decrease, and wherein the controller can operate the DC to DC converter in a first mode, and the controller can operate the DC to DC converter in a low power mode, and wherein the controller uses information about a switching time of the first electrically controlled switch in the first mode to control a switching time of the first electrically controlled switch in the low power mode.

The controller may be associated with a buck converter (step down), a boost converter (step up) or a buck-boost converter.

According to a first embodiment of the present invention there is provided a controller for a DC to DC buck converter, the converter comprising a first electrically controlled switch, a second electrically controlled switch and an inductor, and wherein placing the first electrically controlled switch in a low impedance state causes a current flow in a first direction through the inductor to increase, and placing the second electrically controlled switch is a low impedance state causes the current flow in the first direction through the inductor to decrease. The controller can operate the DC to DC converter in a first mode. Preferably the first mode is used when a current taken by a load supplied by the DC to DC converter is above a first current threshold, and the controller can operate the DC to DC converter in a low power mode preferably when the current taken by the load is below the first current threshold. The controller uses information about a switching time of the first electrically controlled switch in the first mode to control a switching time of the first switch in the low power mode.

According to a second embodiment of the present invention there is provided a controller for a DC to DC boost converter operable to boost an input voltage received at an input node, comprising an inductor having a first end connected to the input node and a second end connected to an output node by way of a rectifier, and a first switch or current sink connected between the second end of the inductor and a further voltage supply or ground, and arranged such that when the first switch is conducting the current in the inductor increases, and when the first switch is non-conducting the current in the inductor decreases. The controller can operate the DC to DC converter in a first mode preferably when a current taken by a load at the output node of the converter is above a first current threshold, and the controller can operate the DC to DC converter in a low power mode preferably when the current taken by the load is below the first current threshold, and wherein the controller uses information about a switching time of the first switch in the first mode to control a switching time of the first switch in the low power mode.

It is thus possible to utilise information about the performance of the DC to DC converter operation just prior to entering the low power mode to modify the operation of the DC to DC converter in the low power mode. This is beneficial as it inherently passes information about the relationship between the input voltage at the input of the DC to DC converter and the output voltage at the output of the DC to DC converter into the low power mode control strategy. When the DC to DC converter is a buck converter, the information that is passed to the low power mode control strategy is approximately proportional to the ratio of the output voltage to the input voltage. Where the DC to DC converter is a boost converter, then the information that is passed may be regarded as approximately proportional to the compliment of this ratio. Where the converter is a buck-boost converter, then the information that is passed depends on whether the converter is operating in a buck or a boost mode.

In an embodiment, the converter measures on and off times for a high side switch, or alternatively the on time for the high side switch and the on time for a low side switch, and uses this to estimate an initial high side switch and an initial low side switch “on” time during an initial cycle or during a first couple or few cycles, of the low power mode. In subsequent cycles the switch times, for example of the high side switch, can be controlled by a closed loop.

According to a second aspect of the invention there is provided a combination of a controller according to the first aspect in combination with a DC to DC controller.

According to a third aspect of the present invention there is provided a method of operating a DC to DC converter, the converter comprising a first electrically controlled switch and an inductor, and wherein placing the first electrically controlled switch in a low impedance state causes a current flow in a first direction through the inductor to increase, and placing the first electrically controlled switch in a high impedance state causes the current flow in the first direction through the inductor to decrease, and wherein the DC to DC converter is operated in a first mode when a current taken by a load supplied by the DC to DC converter is above a first current threshold, and the DC to DC converter is operated in a low power mode when the current taken by the load is below the first current threshold, and wherein information about a switching time of the first electrically controlled switch, such as the duration for which the switch is closed, in the first mode is used to control a switching time, such as the switch closed time, of the first switch in the low power mode.

BRIEF DESCRIPTION OF THE DRAWINGS

Example embodiments of the invention will now be described, in a non-limiting manner, with reference to the accompanying drawings, in which.

DESCRIPTION OF EMBODIMENTS

Figure 1:
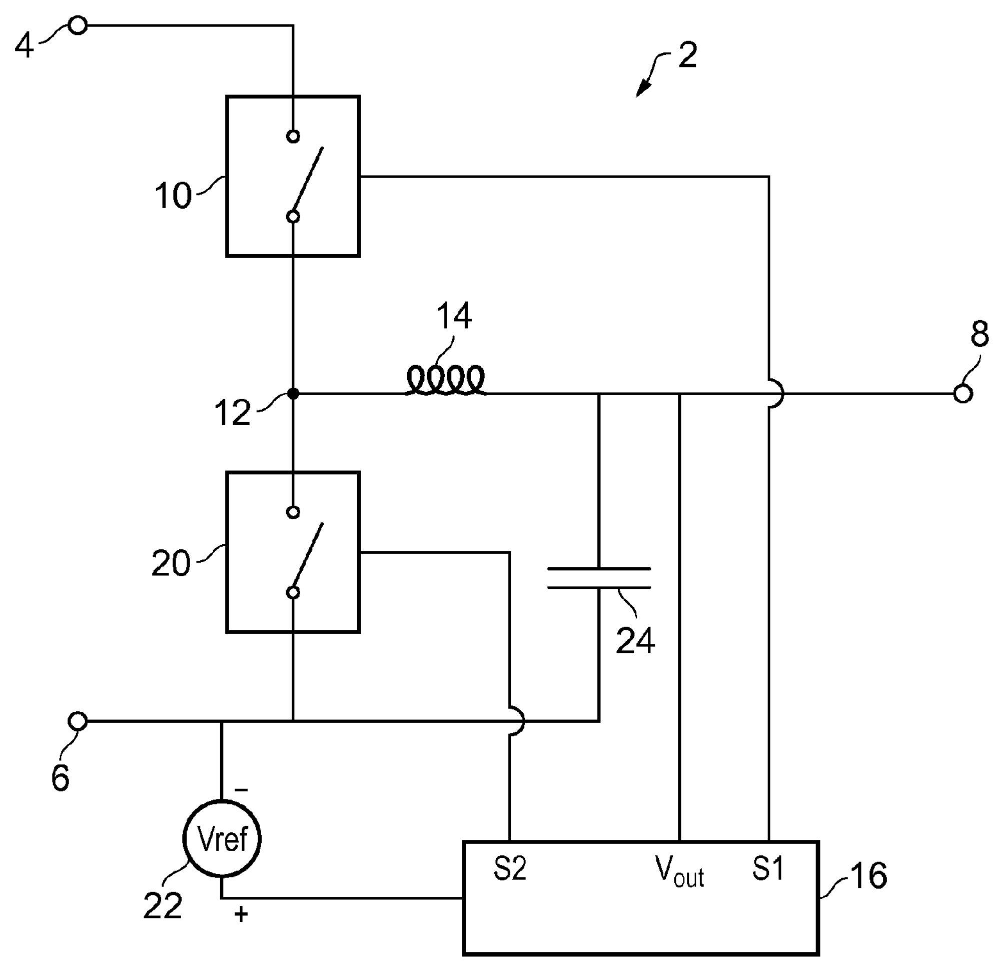
FIG. 1 is a circuit diagram of a DC to DC converter in association with a controller that is an embodiment of the invention.

FIG. 1 is a circuit diagram of a DC-DC converter, generally designated 2, constituting an embodiment of the present invention. The DC-DC converter of FIG. 1 is a buck converter, also known as a buck regulator, which receives a first potential difference between a first input node 4 and a second input node 6, and which outputs a reduced voltage difference between an output node 8 and the second input node 6.

A buck regulator is often used with battery powered equipment where, for example, an anode of a battery or battery array is connected to the first input node 4 and the cathode of the battery or battery array is connected to the second input node 6. Typically, because the voltages in an item of battery powered equipment can float with respect to earth, it is convenient to regard the battery cathode as defining a local 0 V reference or a local ground.

A first electrically controlled switch 10, which can be regarded as being a high side switch, is connected between the first input node 4 and a common node 12. A first end of an inductor 14 is connected to the common node 12. A second end of the inductor is connected to the output node 8. The first electrically controlled switch 10 is responsive to a first switch control signal S1 provided by a controller 16.

A second electrically controlled switch 20, which can be regarded as a low side switch, is connected between the common node 12 and the second input node 6. The second electrically controlled switch 20 is responsive to a second switch control signal S2 provided by the controller 16.

The controller 16 has an "output voltage" input $V_{out}$ connected to the output node 8. The controller, in use, acts to compare the output voltage at node 8 with a reference voltage, $V_{ref}$, which may be internally generated within the controller or, as shown in FIG. 1, provided by a voltage reference 22 to an input of the controller 16.

The operation of a DC-DC converter of the type shown in FIG. 1 is, in general terms, known to the person skilled in the art. However, by way of a reminder, a brief description will be given here.

Suppose the voltage at the first input terminal 4 is V1, the voltage at the second input terminal 6 is V2 and the output voltage at the output node is $V_{out}$.

In use $V1>V_{out}$, and $V_{out}>V2$.

The controller 16 is arranged to operate the first switch 10 and the second switch 20 in a pulse width modulated manner so as to successively build and then reduce current flow in the inductor 14.

In a first phase, which can be regarded as a current build phase, the first switch 10 is closed.

The voltage $V_{ind}$ across the inductor 14 is approximately $$V_{ind} \approx V1 - V_{out} \qquad \text{equation 1}$$

And the rate of increase in current within the inductor 14, having an inductance L is approximately $$\frac{dI}{dt} \approx \frac{(V1 - V_{out})}{L} \qquad \text{equation 2}$$

Figure 2:
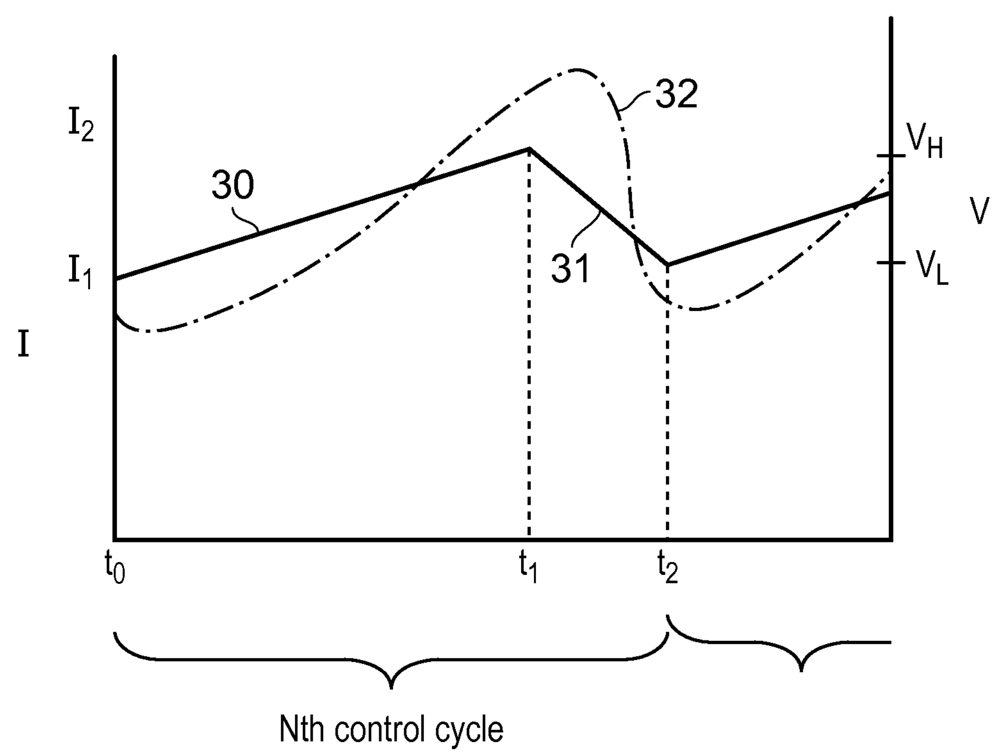
FIG. 2 shows a current waveform (solid line) and output voltage (chain-dot line) for a buck converter.

The current flows for a time t1, as shown in FIG. 2 by curve 30, during which it rises from a value I1 to I2, towards the output node 8. Some of the current exits the output node 8 to supply a load connected to the output node.

Returning to FIG. 1, it can be seen that a capacitor 24 is connected between the output node 8 and the second input node 6. This acts as a reservoir capacitor to accept and store some of the charge.

The change in voltage at the capacitor C can be approximated as:

$$\Delta V_{out} \approx \int_0^{t1} \frac{i_{capacitor}}{C}\, dt \qquad \text{equation 3}$$

where $i_{capacitor}$ is the amount of current that flows from the inductor 14 into the capacitor 24, and C is the capacitance of the capacitor.

The controller 16 may, for example, be a hysteretic controller when operating in the first mode (not low power mode). Such a controller acts to keep the first switch 10 conducting until such time as $V_{out}$ has risen to an upper threshold $V_H$. It should however be noted that the nature of the controller or control scheme used to implement the pulse width modulation in the first mode is not relevant to the present invention, and any suitable controller such as constant on or off time controllers, peak current mode or valley current mode or voltage mode controllers may be used. However, for ease of discussion, it will be assumed that the controller operates as a hysteretic controller when the current drawn by the load is greater than a first current threshold, or sufficiently large to warrant operation in the first mode.

Once $V_{out}$ has risen to its upper threshold $V_H$, the controller 16 opens the first switch 10. After a brief delay to ensure that the first switch has become high impedance, the controller closes the second switch 20, thereby marking the commencement of a second phase in which the current in the inductor is reduced, and bringing the voltage at the first end of the inductor down to V2. In fact, it should be noted that since the current that had built in the coil during the first phase now flows through the second switch 20, there will be a small voltage dropped across the second switch 20. This small voltage drop is insignificant in terms of its impact on the analysis presented here, but it should be noted that this voltage drop can be exploited to measure the current magnitude and direction of current flow.

During the second phase, the voltage across the inductor 14 can be written as $$V_{ind}=V2-V_{out} \quad \text{equation 4}$$

And the change in inductor current is $$\frac{dI}{dt}=\frac{V2-V_{out}}{L} \quad \text{equation 5}$$

Since V2 is less than $$V_{out}, \frac{dI}{dt}$$

is negative and the current in the inductor starts to reduce, as indicated in FIG. 2 by line 31 with the inductor current reducing from I2 to I1 in a period t2.

If, as is often the case, $V_{out}$ is much closer to one of V1 and V2 than the other one of V1 and V2, then the rates of current build and current decay are significantly different. The current waveform shown in FIG. 2 is indicative of a system where $V_{out}$ is much closer to V1 than it is to V2.

During the period from time t0 to time t1 some of the inductor current flows to the load. Further analysis reveals that at the moment the first switch 10 was switched off, the current in the inductor 14 was sufficient to meet the demand of the load and to be charging the capacitor 24 so as to increase the voltage on the capacitor.

When the second switch 20 is turned on, the magnitude of the current is, to a first approximation, unchanged, so the output voltage $V_{out}$ briefly continues to rise until such time as the inductor current reduces to become less than the load current, and as a consequence the capacitor 24 starts to supply current to the load. The voltage on the capacitor starts to fall, and the controller 16 is responsive to this, and keeps the second switch 20 in a conducting state until such time as the output voltage $V_{out}$ has fallen to a lower threshold value $V_L$.

Once $V_L$ is reached, at time t2, the second switch 20 is made high impedance. The high side (first) switch 10 is closed, but there is a delay between this occurring and the current building to a level that stops some of the current to the load being supplied from the capacitor. Therefore, initially the voltage continues to fall. The time period t0 to t2 represents the duration of one control cycle of the DC-DC converter. Once one, i.e. Nth, control cycle has completed, a subsequent, N+1th, control cycle is commenced by the controller 10 opening the first switch 10 to cause current to build in the inductor.

The evolution of $V_{out}$ with respect to time for the scenario described above is shown in FIG. 2 by chain-dot curve 32.

In such a hysteretic control scheme the duration of each control cycle, and hence the switching frequency of the DC-DC converter, can be controlled by the difference between $V_H$ and $V_L$. This difference can be regarded as a hysteresis, and such a control scheme as described here is a hysteresis control scheme (or hysteretic control scheme).

The first and second switches 10 and 20 may have to operate vary rapidly, and are often implemented as field effect transistors.

During switching from a high impedance state to a low impedance state, the transistor forming the switch inevitably passes through an intermediate impedance regime where it is resistive and hence dissipates some power by virtue of Joule heating of the transistor. Similarly the gate of the FET represents a capacitive load, and this capacitance, though generally small, needs to be charged and discharged by the controller 16 as part of each control cycle. Both of these effects give rise to "switching losses" in which energy is lost as heat.

The switching losses are generally very small relative to the full output power capability of a DC to DC converter, and often regarded as insignificant when the load is drawing current.

However, in devices where power use is variable, a load may be intermittently depowered or placed in a very low power state, for example to conserve energy in a battery powered system, to reduce heat dissipated in the device, or to improve the energy efficiency of the device. Under such conditions, when the load draws little or no current, then the switching losses may become a significant portion of the power drawn from the power source, such as battery.

Under such circumstances it is desirable to modify the operation of the DC-DC converter to place it in a low power mode.

However, the process for deciding when to enter into a low power or power save mode should itself be simple so as not to burden the controller 16 with complicated circuitry that substantially or significantly increases the current drawn by the controller.

The controller also would benefit from a strategy for controlling the switches during the power save mode.

Some prior art controllers are known that enter into a pulse skipping mode when they are lightly loaded. Prior art controllers for DC to DC converters make no provision for using knowledge of operating conditions prior to entering a power save mode to inform the controller of how to operate during the power save mode. They merely transition from one mode to another once a transition criterion has been reached.

An embodiment of the present invention provides a controller which monitors its operating parameters during "normal" operation (when it is not in a power save mode) so as to control its operation during power save mode.

Figure 3:
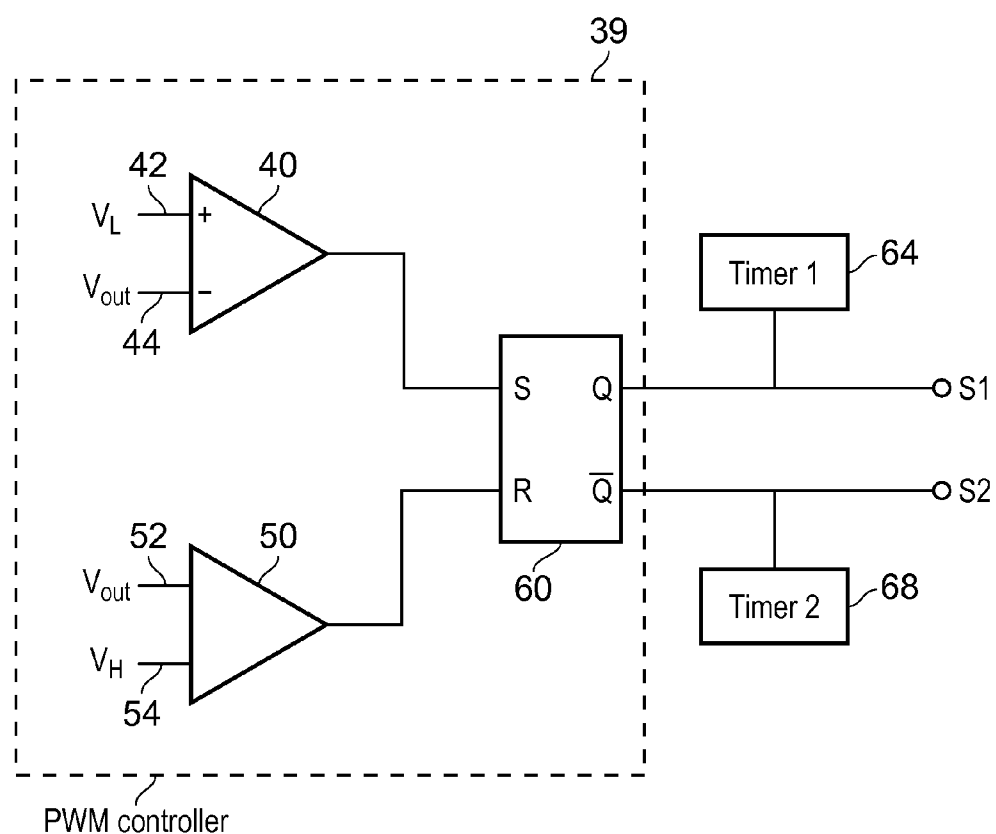
FIG. 3 is a circuit diagram showing some of the internal circuit of the controller of FIG. 1 in greater detail.

FIG. 3 is a simplified diagram of a controller constituting an embodiment of the invention. It should be noted that the present invention is applicable to any pulse width modulation, PWM, controller architecture, as represented by the box 39 which delimits the components of a prior art PWM controller. For the purposes of describing the invention in the context of an operational system, the components of a hysteretic controller have been illustrated. A first part of the hysteretic controller is relatively conventional, and functions as a pulse width modulated controller for controlling the switches 10 and 20 with control signals S1 and S2 respectively during operation outside of the power save mode. For simplicity, additional circuitry that prevents 51 and S2 switching the high and low side switches 10 and 20 on at the same time has not been shown.

The PWM part of the controller 16 comprises a first comparator 40 which receives the lower voltage threshold $V_L$ and its non-inverting input 42 and $V_{out}$ at its inverting input 44. Consequently the first comparator 40 asserts an output only when $V_L$ is greater than $V_{out}$. This indicates when the output voltage $V_{out}$ is too low, and the first switch 10 should be made low impedance so as to build current in the inductor 14 of FIG. 1.

The PWM part of the controller 16 also comprises a second comparator 50 which receives $V_{out}$ at its non-inverting input 52 and the upper threshold $V_H$ at its inverting input 54. As a consequence the second comparator 50 only asserts its output when $V_{out}$ is greater than $V_H$. This indicates when the output voltage $V_{out}$ has exceeded the upper threshold and the current needs to be decreased by connecting the first end of the inductor 14 to V2.

The output of the first comparator 40 is provided to a "set" input of a set-reset latch 60. The output of the second comparator 50 is provided to a reset input of the set-reset latch 60. A "Q" output of the set-reset latch provides the drive signal S1, and a $\overline{Q}$ output of the set reset latch provides the drive signal S2. The set-reset latch becomes set, and Q1 is asserted when a logic 1 is applied to its set input and remains set, even when the signal at its set input is removed, until such time as it is reset by a logic 1 at its reset input. The comparators 40 and 50, and the set-reset latch 60 only represent one form of PWM controller, and these components may be replaced by any suitable PWM controller.

The PWM controller 39 is modified by the inclusion of a first timer 64 which measures a time, T1on_mode 1, in each control cycle that S1 is asserted. The timer 64 may be provided as a counter that counts clock cycles during the time that S1 is asserted to drive the high side switch 10 into a conducting state. The count is then stored, for example in a latch, as a digital code.

Similarly a second timer 68 is provided to measure a time, T2on_mode 1, for which the low side switch 20 is conducting for a control cycle.

As an alternative to measuring the time for which the second switch 20 is conducting, the second timer 68 may be arranged to measure the time period, T1off_mode1, for which the first switch 10 is not conducting.

Similarly, an estimate of the operation of the DC-DC converter could be obtained by measuring the times for which the second or low side switch is conducting and is not conducting in a given control cycle.

This information may then be used to modify the operation of the controller 16 when it is in a power save mode.

Figure 4:
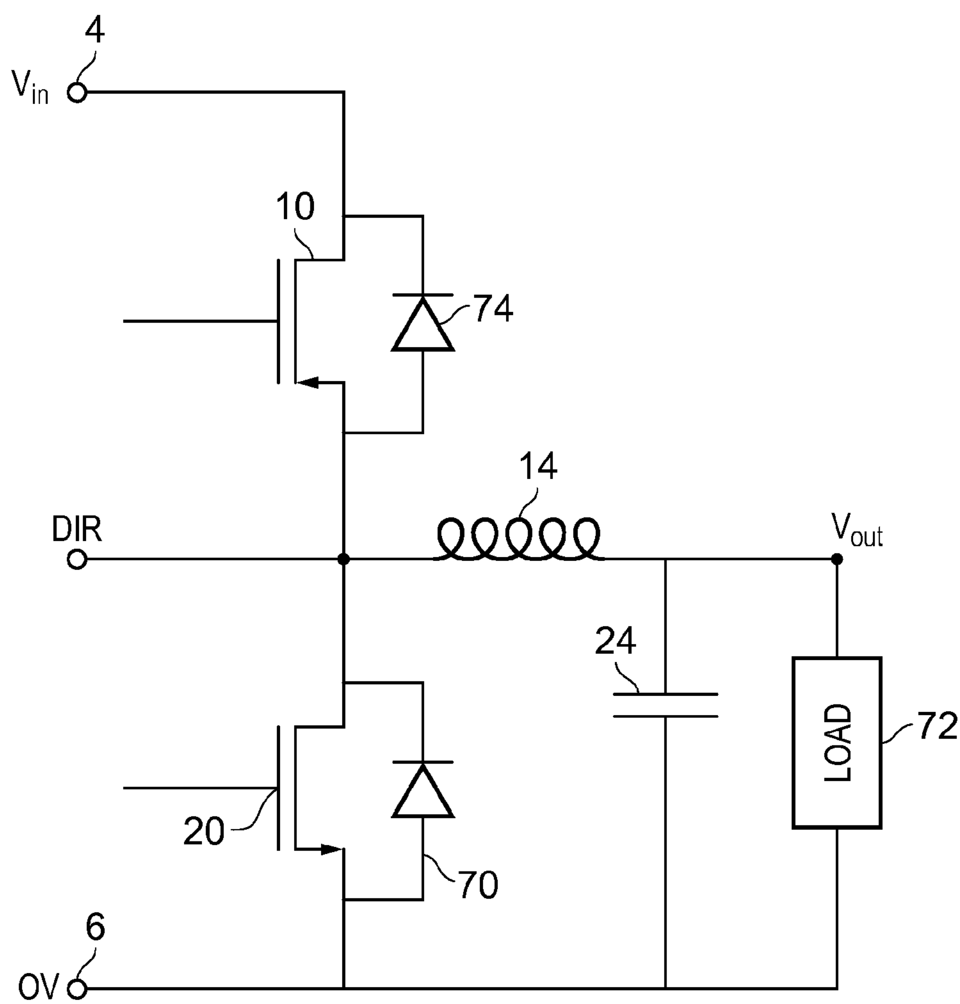
FIG. 4 shows the components of the DC to DC converter of FIG. 1 in greater detail.

The controller 16 also needs to make a decision as to when to enter power save made. As the load current reduces, the action of the PWM controller 39 is to shorten the duration for which the first switch or high side switch 10 is conducting, and/or to lengthen the duration for which the low side switch 20 is on. This has the capability to keep the low side switch 20 on for sufficient duration for the current flow in the inductor 14 to reverse, and for the capacitor 24 to start to discharge to the second input node 6 via the inductor 14 and the second or low side switch 20. The direction of current flow can be monitored by a dedicated current sensor, or by measuring the voltage drop across the second switch at the end of its "on" time. In practice the switch 20 either has an internal body diode or is provided in parallel with an additional diode 70, as shown in FIG. 4, which is reverse biased so that it does not conduct when the high side switch 10 is closed and the low side switch 20 is open, and the direction of current flow can be determined by measuring the voltage drop across the protection diode 70. Similarly the high side switch 10 is also associated with a parallel and normally reverse biased diode 74.

During each control cycle the first switch 10, which as shown in FIG. 4 may be implemented as a PMOS device (and hence is switched on by taking its gate low, so S1 of FIG. 3 may be inverted to drive the PMOS device), and the second switch 20 which may be implemented as a NMOS device, must not be conducting at the same time otherwise the supply $V_{in}$ would be short circuited. Thus, at a couple of instances in each control cycle both transistors 10 and 20 are off. However, a current has built up in the inductor 14, and it generally flows in a loop comprising the inductor 14, load 72, and the protection diode 70 which becomes forward biased by the current.

Thus, the direction of current flow can be determined by measuring the voltage DIR at node 12, just after the second switch 20 has been switched off. For example, if diode 70 is a silicon diode, then if "DIR" is about −0.7 V it can be inferred that the diode 70 has been forward biased by the current flow and the current is flowing in its "normal" direction which can be regarded as a first direction, so as to charge the capacitor 24. If DIR is positive then the current flow has been reversed. If the current flow has become reversed, such that it flows in a second direction which is opposed to the first direction, then when the second switch is turned off, the voltage DIR becomes positive as the current flows in a loop comprising the inductor 14, load 72, protection diode 74 and the voltage source connected between the first and second inputs 4 and 6. Thus the voltage DIR should rise to a value which corresponds to one diode voltage drop above Vin.

Figure 5:
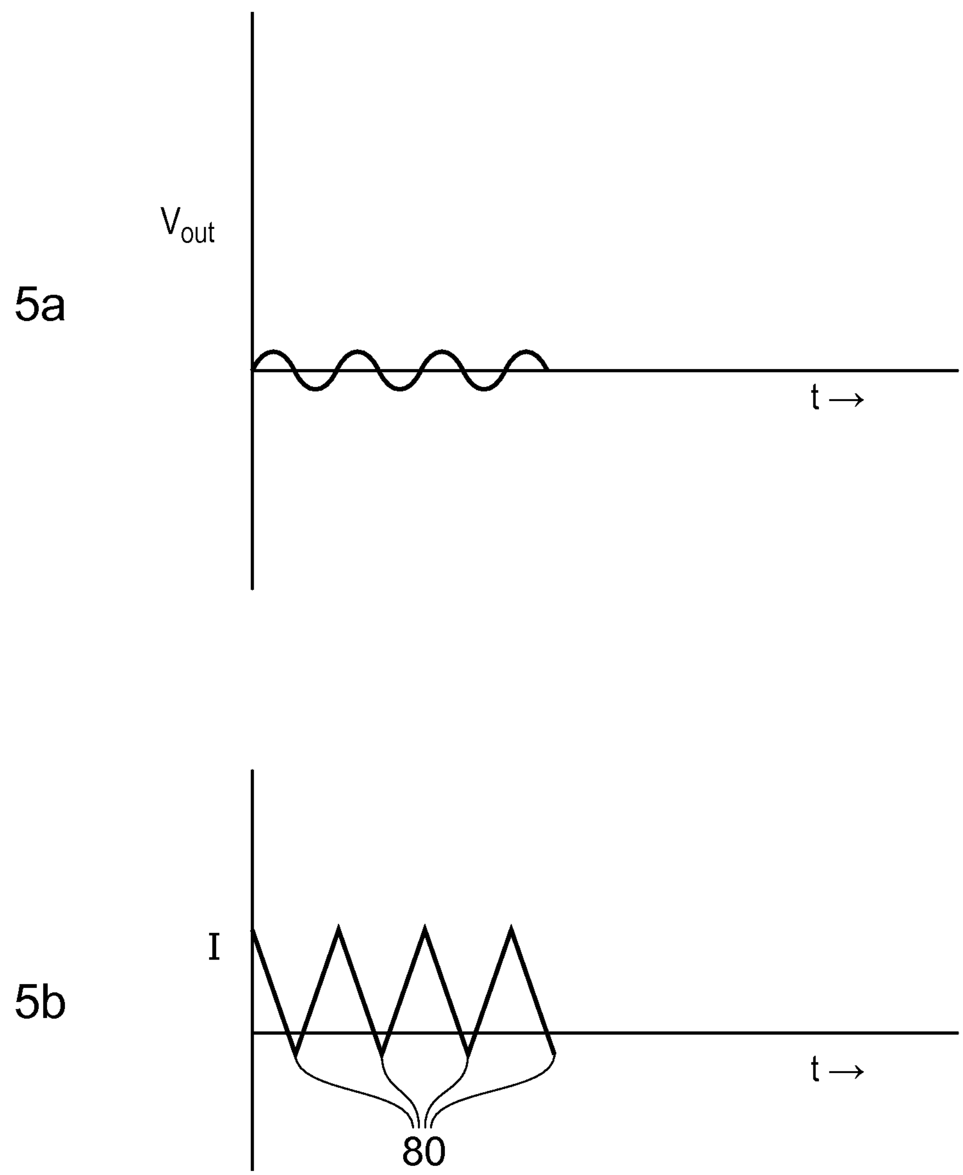
FIGS. 5*a* and 5*b* show converter output voltage and inductor current, respectively, under low load conditions.

Thus, by a relatively simple voltage measurement made just after the second switch 20 is placed in a high impedance state, it is possible to determine whether the direction of current flow has reversed, as indicated by the regions 80 in FIG. 5*b*. It can be seen from FIG. 5*a* that $V_{out}$ remains well regulated at this time and hence provides no indication that losses within the DC-DC converter are becoming excessive.

In order to determine the appropriate time to enter power saving mode the controller 16 constituting an embodiment of the invention may keep a running count of the number of times that the current at the lowest current flow point of each cycle (as a directed value rather than as a magnitude), which may be known as a valley current, has become negative. Power save is entered when the valley current is negative for a predetermined number P of consecutive cycles. P may be as low as 1, but preferably is two or more so as to reliably establish that the load current has become small. In an embodiment, P may be 5 or 6. Smaller or larger values of P may be selected. In some embodiments P may be selected to correspond to a row of 1's in a binary representation of a number, and hence values of 15, 7 or 3 may be selected.

Once power save mode is entered, the controller starts a modified pulse skipping regime that uses the time measured by the first and second timers 64 and 68 to determine the operational times for the first and second switches.

In a first power save cycle, the first switch is made conducting for a time period T1on_low_power equal to Q*Timer 1, where Q is a coefficient and Timer 1 is the duration captured in the first timer 64 as the duration of the most recent first switch on duration T1on_mode1 for normal PWM operation. Q may be a coefficient greater than unity. Q is generally less than ten. Q need not be an integer. However, in a digital system where the time was measured by counting clock pulses, Q is advantageously 2 or 4 as such a multiplication can be achieved by shifting the binary count by one or two places, respectively, and then counting the counter down as a way to determine how long they keep the first switch conducting.

Figure 6:
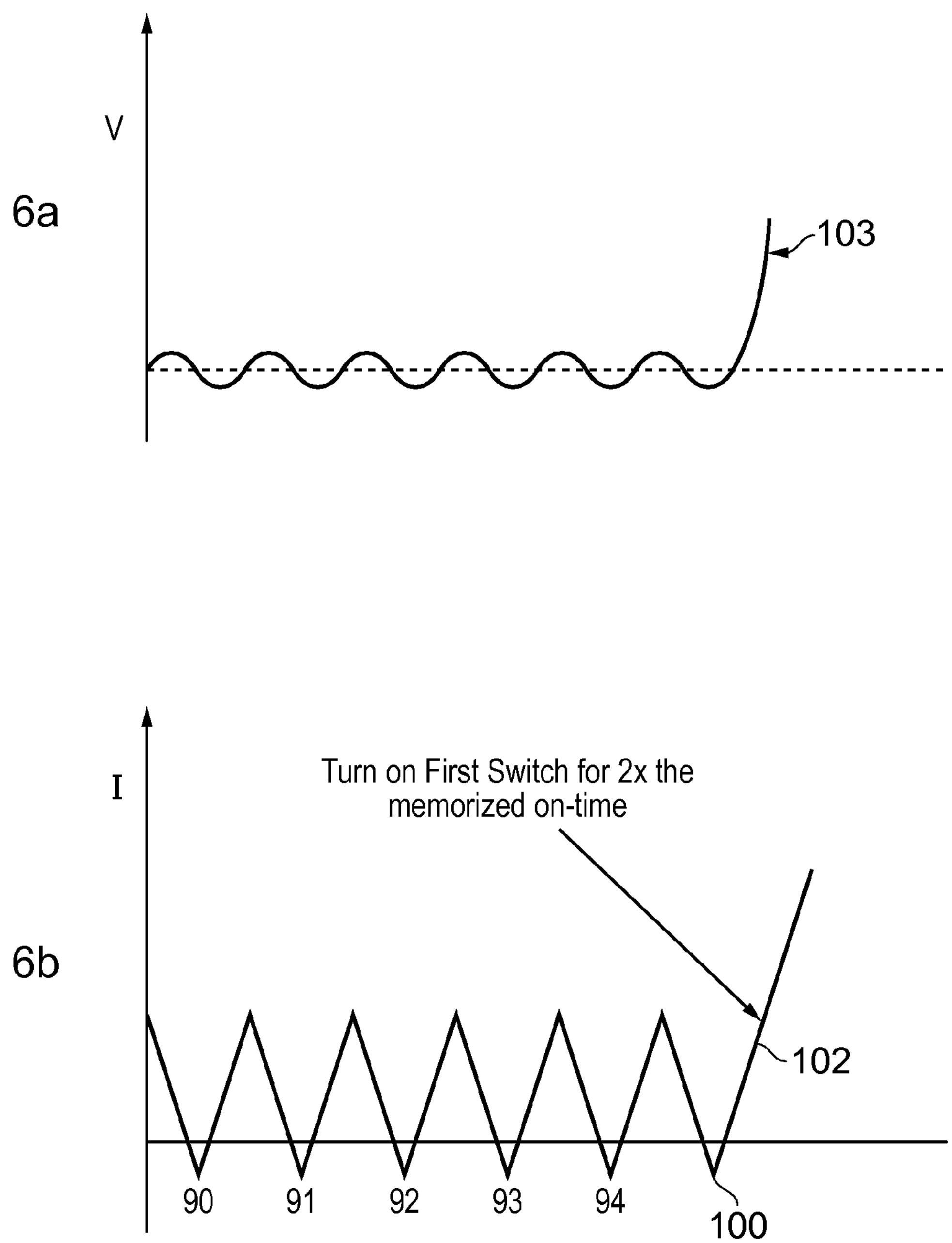
FIGS. 6*a* and 6*b* show converter output voltage and inductor current, respectively, during a first part of a first operating cycle under a power save mode.

The current waveform resulting from this first part of the first power save cycle is shown in FIG. 6.

FIG. 6*a* shows the output voltage $V_{out}$ and 6*b* shows the inductor current in the inductor 14 in a time frame starting just before power save mode is initiated and during the first part of a first power save control or switching cycle. FIG. 6*b* commences with the valley current in the inductor going negative, as indicated 90, in one of the first mode control cycles. A counter is incremented within the controller from 0 to 1 as a result of this happening. The valley current goes negative in the succeeding first mode cycles, as indicated by 91, 92, 93, 94, and the counter has now reached 5. In the next first mode cycle the valley current goes negative yet again and the counter is incremented to 6, which in this example corresponds to the predetermined number P of consecutive cycles required to initiate the power save mode.

Once power save mode is entered, the first action is, in a first part of a first power save mode control cycle, to turn the high side switch 10 on for a extended period of time T1on_low_power, in this example twice the time value held in the high side switch timer 64 so as to cause the current to build, as indicated by segment 102 of the graph of inductor current versus time in FIG. 6. This causes the output voltage to rise above the value $V_H$, as shown by segment 103 of FIG. 6*a*.

Figure 7:
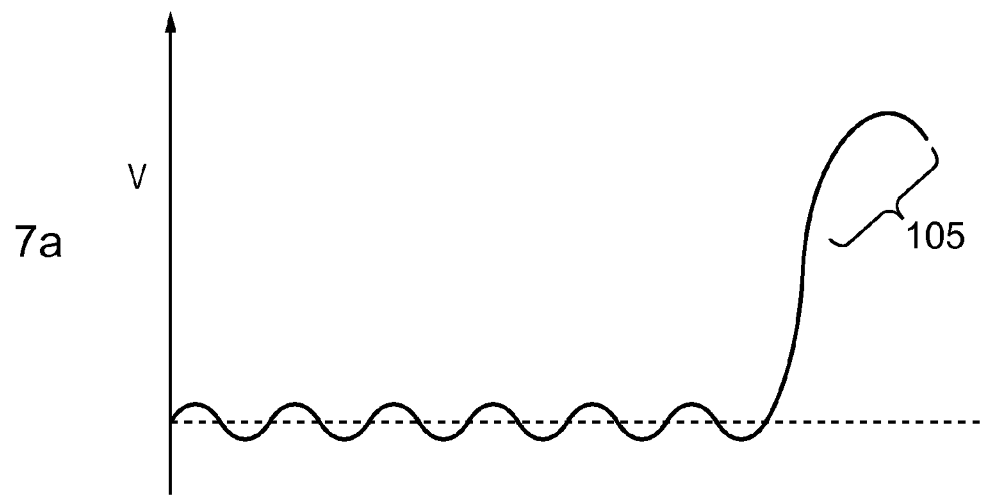
FIGS. 7*a* and 7*b* show converter output voltage and inductor current, respectively, during a second part of the first operating cycle in the power save mode.
Figure 7:
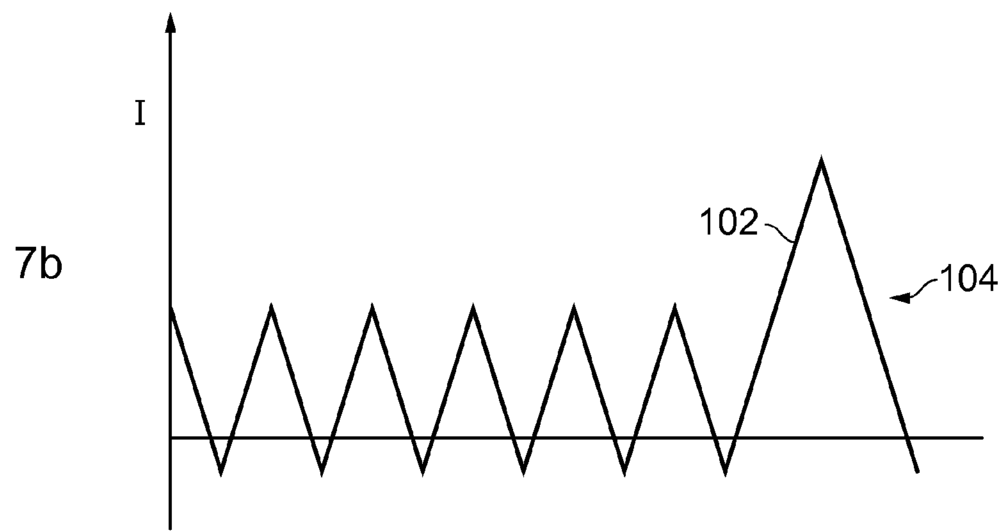

In a second part of the first power save cycle the high side switch 10 is turned off and the low side switch 20 is turned on for a period T2on_low_power which is a multiple S of the low side switch on time T2on_mode1 held in timer 68. The coefficient S by which the switch 20 on time is extended is preferably the same as the coefficient Q used to extend to high side switch on time. In this example the low side switch is turned on for a period corresponding to twice the time period S2on_mode1 stored in the timer 64. This causes the current in the inductor 14 to decrease, as shown by segment 104 of FIG. 7*b*. In all probability the inductor current will just turn negative at the end of the second part of the first power save cycle. The evolution of voltage is such that the voltage $V_{out}$ continues to rise during part of the time that the low side switch 20 is conducting, before starting to fall back, as shown by region 105 of the plot of $V_{out}$ versus time shown in FIG. 7*a*.

Figure 8A:
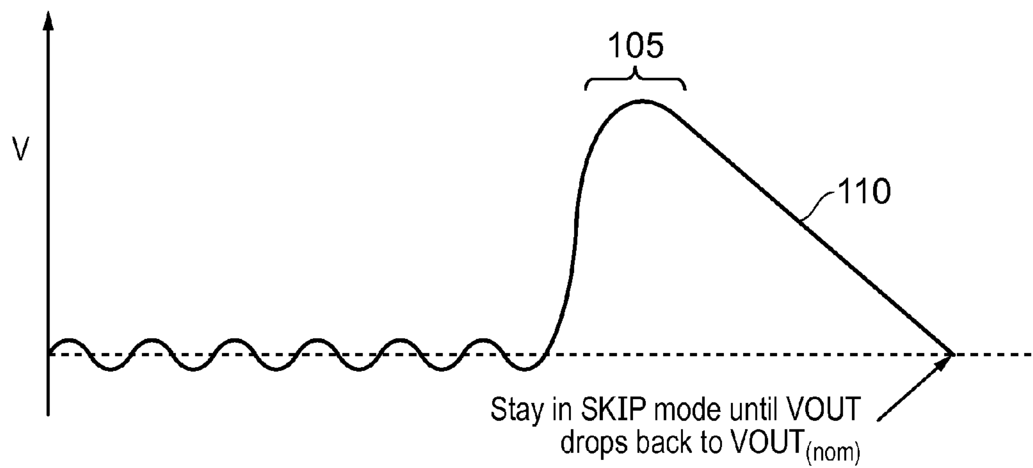
FIGS. 8*a* and 8*b* show converter output voltage and inductor current, respectively, during a third part of the first operating cycle in the power save mode.
Figure 8B:
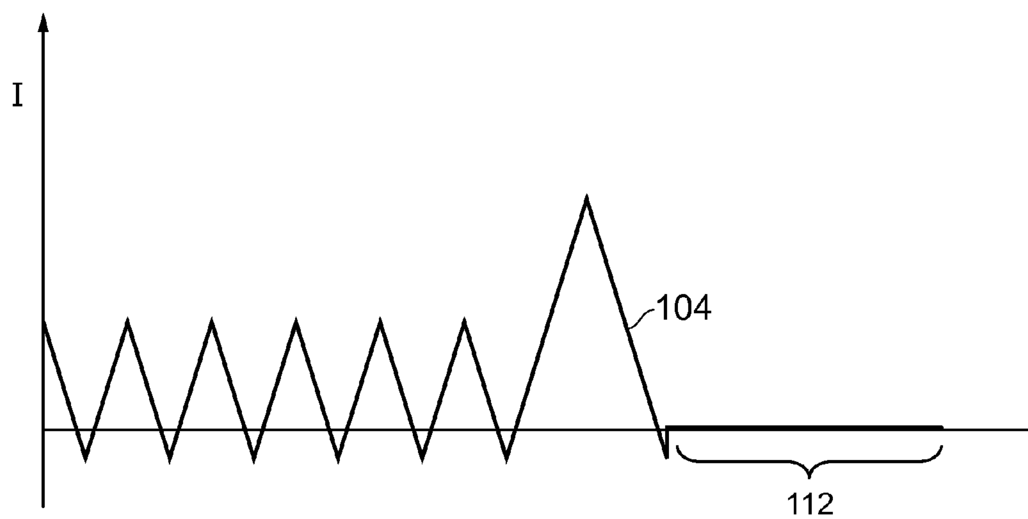

Having completed a current build and current decay cycle, the controller can enter a quiescent mode in a third part of the first power save mode control cycle in which most of the controller 16, except the comparator 40 can power down, while the output voltage drifts downwardly to the lower voltage threshold $V_L$, as indicated by region 110 of FIG. 8*a*. During this time the inductor current is zero, as shown by region 112 of FIG. 8*b*.

Thus, during the time period denoted by regions 110 and 112, there is no transistor switching within the DC-DC converter and nearly all of the switching controller has been depowered. Therefore the power consumption by the DC-DC converter is very low.

Figure 9A:
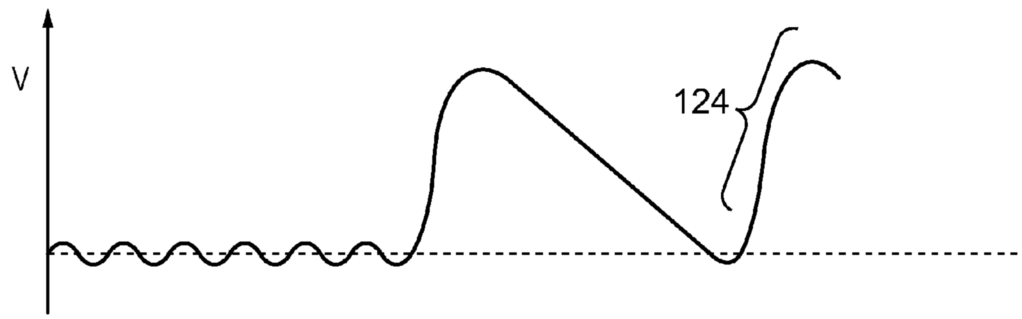
FIGS. 9*a* and 9*b* show converter output voltage and inductor current, respectively, during the first and second parts of a second operating cycle in the power save mode.
Figure 9B:
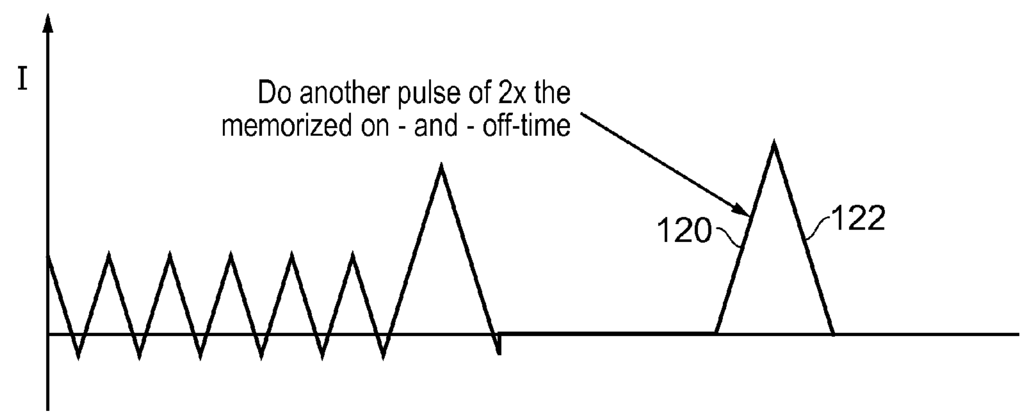

When the output voltage reaches the nominal value of $V_{out}$ (or $V_L$) then a second power save cycle is performed. The second cycle may, as shown in this example, involve switching the first (high side) switch 10 on for a period of Q.Timer1, followed by switching the low side switch 20 on for a period S.Timer 2 as shown by region 122 of FIG. 9*b*. This causes the voltage $V_{out}$ to rise, as shown by region 124 of FIG. 9*a*. In an embodiment of the invention S=Q.

The inductor current in the inductor 14 at the end of the second power save cycle is examined to determine the direction of the current flow. This can, as mentioned before, be performed by sampling the voltage at the node 12 just after the second switch 20 has been turned off.

This information may then be used to modify the time for which either the low side switch 20, the high side switch 10, or both are operated in subsequent control cycles of the power save mode.

Figure 10A:
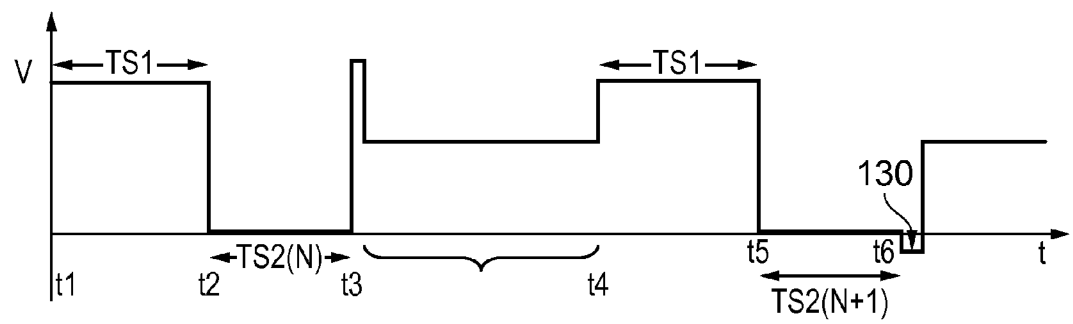
FIGS. 10*a* and 10*b* show voltage at the common node 12 of FIG. 1 and inductor current, respectively, during an Nth and a N+1th cycle in the power save mode, where N>2.
Figure 10B:
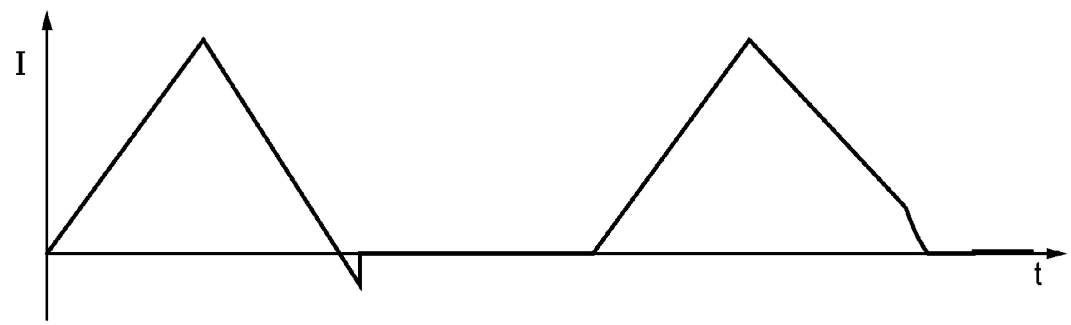

FIG. 10*a* shows the voltage at the common node 12, and FIG. 10*b* shows current in the inductor 14.

As shown in FIG. 10*a*, the time for which the first switch 10 is on is indicated as TS1 (Time for Switch 1) which is equal to Q*T1on_mode1. The time range shown in this Figure starts with the commencement of a Nth cycle during power save mode, where "N" represents a control cycle count. The current build for the Nth cycle commences at time t1 and finishes at time t2, where t2=t1+TS1. Then a first phase of current decrease occurs as indicated by TS2(N) where TS2(N) represents the time for which the low side switch 20 is conducting.

For the first power save mode cycle (and optionally the second) TS2 is equivalent to the time counted by Timer 68, (S2on_mode1) as multiplied by the coefficient S.

However, as will be discussed, in subsequent cycles the value of TS2(N+1) may vary from the value of TS2(N) by an incremented or decremented value ATS2.

Returning to FIG. 10, at the end of TS2(N), i.e. at t3, the voltage at the node 12 is examined. As shown it is positive, and slightly greater than $V_{in}$, which indicates that the current in the inductor has reversed. Thus the duration for which the low side switch 20 is conducting is too long, and should be decremented for the N+1th control cycle.

Once the current direction measurement has been made at time t3, no further switching is done while the output voltage $V_{out}$ remains above the voltage threshold $V_L$, as previously described with respect to FIG. 8. The output voltage in this example remains above $V_L$ until time t4.

Once the output voltage drops to $V_L$, the N+1th switching cycle is initiated. Thus, as time t4 the next build cycle is started by switching the high side switch on for a period TS1 which finishes at time t5. The low side switch is then enabled for a period of TS2 which, because the current flow at the end of the Nth cycle was negative, has been decreased to TS2(N+1)=TS2(N)−ΔTS2, and which finishes at time t6.

In this example, the current at time t6 is still positive, so when the low side switch opens, the current forces the parallel protection diode 70 on to conduct. Since the anode of the diode 70 is connected to the 0 V rail, as shown in FIG. 4, the voltage drops below 0 V, as shown in the stepped region 130 in FIG. 10. Therefore, for the (N+2)th control cycle, the low side switch turn on time should be increased such that TS2(N+2)=TS2(N+1)+ΔTS2.

Thus, the length of the low side switch time adjusts towards, and then dithers about, the duration that is required to reduce the inductor current back to zero.

It will be appreciated that a similar response could be achieved by decrementing the high side switch on time instead of incrementing the low side switch on time, and vice versa, or by modifying both the high side and low side switch on time together (e.g. high side time reduced and low side on time lengthened in the same control cycle).

Exit of Power Save Mode

There is a need to determine when the load current has increased such that power save mode should be aborted, and pulse width modulation control of the output voltage be recommenced. This can be achieved by monitoring how quickly the output voltage $V_{out}$ falls to its nominal value or the trip value $V_L$ after the high side switch has been turned off.

In an embodiment of the invention the timer 68 was used to monitor the low side switch on time in the cycle just prior to entering power save mode. This information can be used to determine when to exit from power save. For example a timer may be started once the high side switch is turned off and arranged to measure the time it takes for the voltage $V_{out}$ to drop to $V_L$ following opening of the high side switch. If this happens within a low power mode exit period, then the low power mode is exited. In an embodiment, a time for the voltage to drop is measured by a timer which starts after a time TS2(N)/2 following the closing of the low side switch, and a low power mode exit is performed if the timer times a time $T_C$, and $T_C$<R·TS2(N)+M, where:

N is the present control cycle

R is a coefficient

M is a delay, or time offset, which may be positive or negative

R may, for convenience, be set equal to 0.5.

Figure 11A:
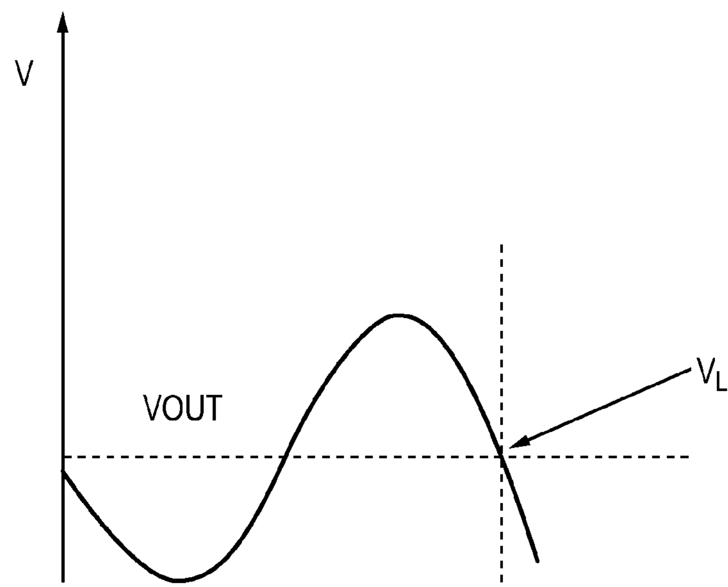
FIGS. 11*a* and 11*b* show converter output voltage and inductor current, respectively, at an exit from power save mode.
Figure 11B:
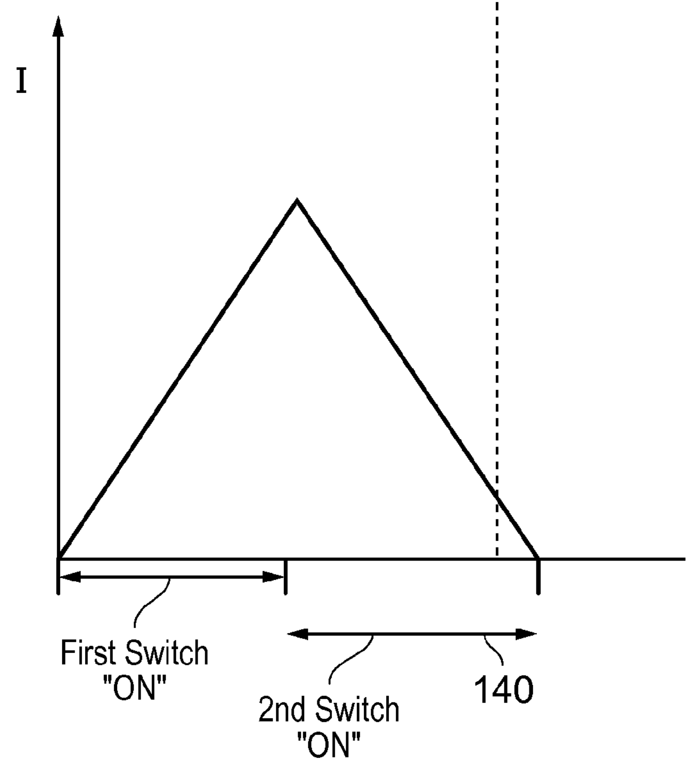

Thus if Vout falls to VL, as shown in FIG. 11*a*, between halfway through the second switch on time 140 shown in FIG. 11*b* and the end of the switch on time, then the power save mode is exited.

It is this possible to provide a simple and robust control strategy for use in a DC to DC converter. Furthermore, only a voltage measurement at node 12 needs to be made in order to gather sufficient information to determine when to enter and exit the low power mode.

Figure 12:
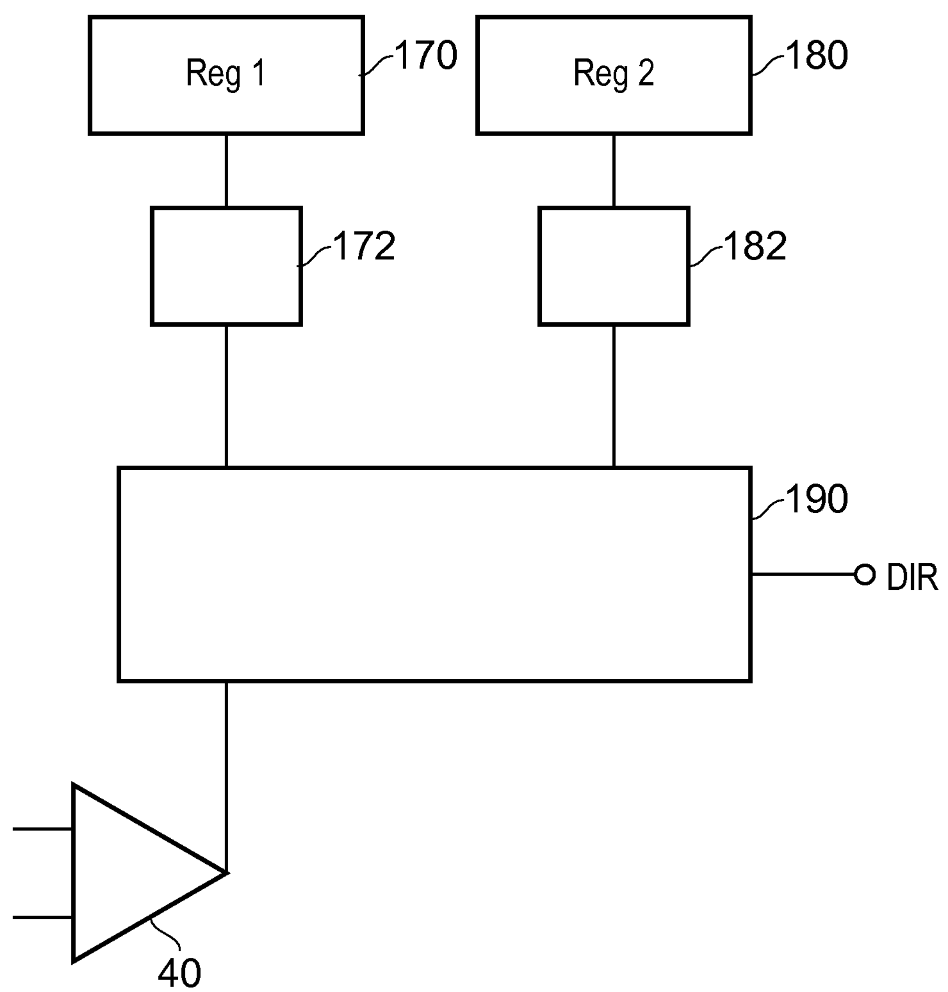
FIG. 12 is a circuit diagram of a low power control circuit of the controller.

The low power mode circuit can be implemented in any suitable form by a person skilled in the art. A simplified form of such a circuit is shown in FIG. 12. The circuit comprises a first register 170 which stores the value of the time that was stored in the first timer 64 for the last high side switch on time before entering the power save mode. Once in power save mode the controller 16 inhibits this register 170 from being updated. An output of the first register 170 is supplied to a multiplier 172 so as to calculate T1on_low_power. Similarly a second register 180 is provided to store the value of time that was stored in the second timer 68 for the last low side switch on time prior to entering the power save mode. The second register 180 is prevented from updating during the power save mode. The output of the second register 180 is provided to a multiplier 182 that calculates the value T2on_low_power. The values T1on_low_power and T2on_low_power are provided to a control circuit 190, which also receives an output of the comparator 40 so as to indicate when the output voltage has fallen to $V_L$ and DIR so it can estimate the direction of current flow in the inductor at the end of T2 on_low_power.

The controller 190 can then implement the control method described herein.

In some embodiments the controller may exit the low power mode after a predetermined time to force a recalibration of the switch times, or may set a maximum value and/or a minimum value for T1_on_low_power and/or T2on_low_power, and exit low power mode if this is reached, again so as to recalibrate the switch on times.

In some embodiments the controller may have an additional input or inputs to allow it to be forced to exit low power mode by another circuit or circuits, for example to prepare the DC to DC converter for an expected increase in load, or to force synchronization to a clock for noise reasons, or based on a sensor output, for example which may indicate a change in the voltage present across the first and second inputs and therefore require a recalibration of the switch times.

In some embodiments the first cycle or the first few cycles of operation in the low power mode may be modified, for example to prevent exit from the low power mode, which would allow the nominal output voltage in power save mode to be positioned higher than the nominal output voltage in the first operating mode.

In some embodiments the final cycle or cycles may be modified, for example to allow continued operation in low power mode despite the exit criterion being met.

Figure 13:
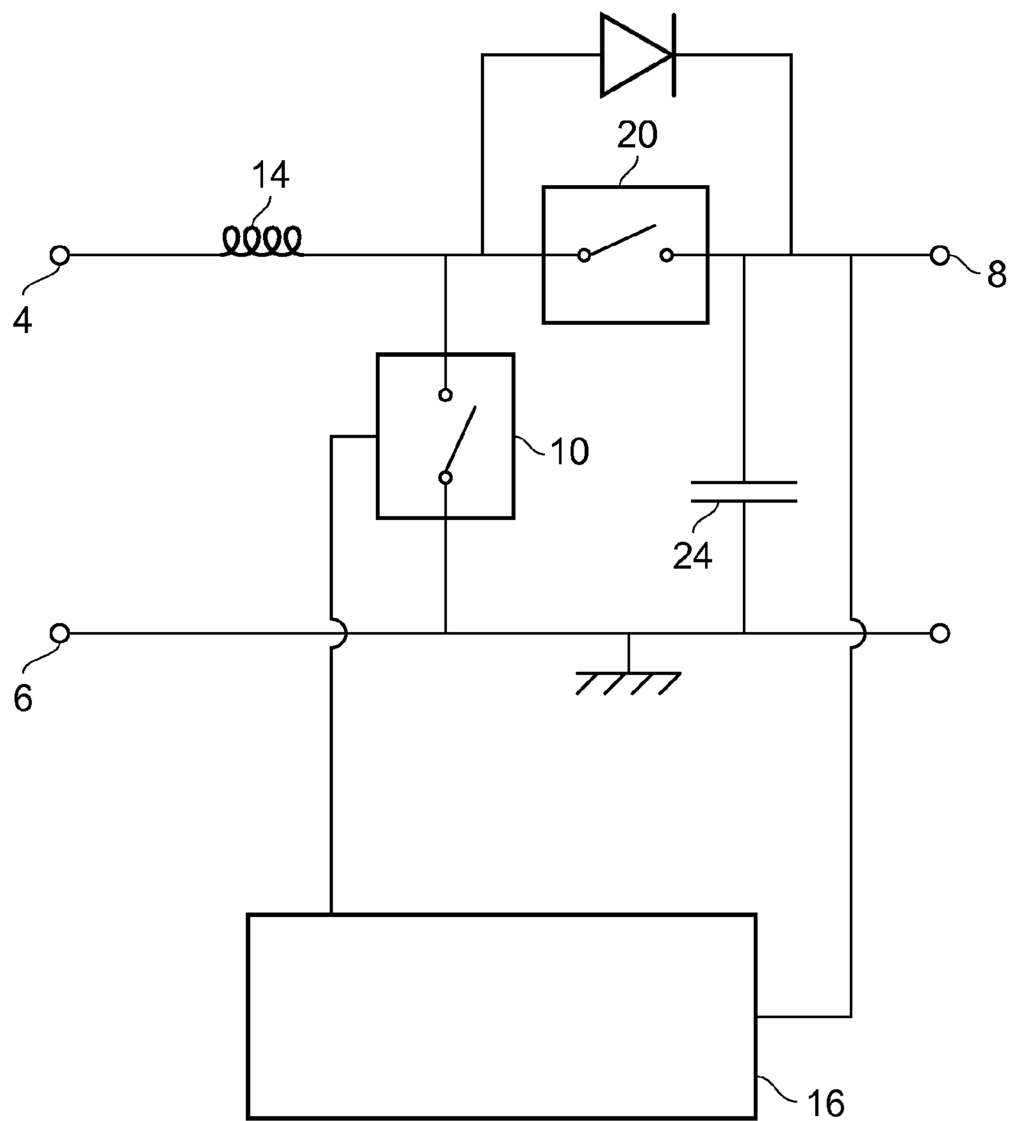
FIG. 13 is a circuit diagram of a boost converter in conjunction with a controller constituting an embodiment of the present invention.

Although the invention has hitherto been described with respect to buck converters or buck regulators, is equally appropriate for use with a boost regulator. Such a regulator is, for the sake of completeness, shown in FIG. 13. The boost regulator has many components in common with a buck regulator, although the configuration of parts is slightly different, and for simplicity like parts have been given like reference numbers. The boost converter still has a first voltage input 4, but now a first end of the inductor 14 is connected to the first input 4. A second end of the inductor 14 is connected to the first switch 10 which selectively connects it to the local ground 6. The second end of the inductor 4 is also connected to the output node by way of a rectifier. The rectifier may be a simple rectifier, such as a diode, or it may be a synchronous rectifier in which case it is implemented as a second electrically controllable transistor switch 20. The operation of the boost converter is well known to the person skilled in the art, but in general terms when it is desired to build current in the inductor 14 the first switch 10 is closed. The current then increases to a target threshold, or for a predetermined value of time, and then the first switch 10 is opened. The current in the inductor cannot instantaneously stop flowing, and therefore a current flow path opens up through the rectifier either by the diode or the second switch 20 in order to charge the capacitor 34 and provide current to the output node 8.

Figure 14:
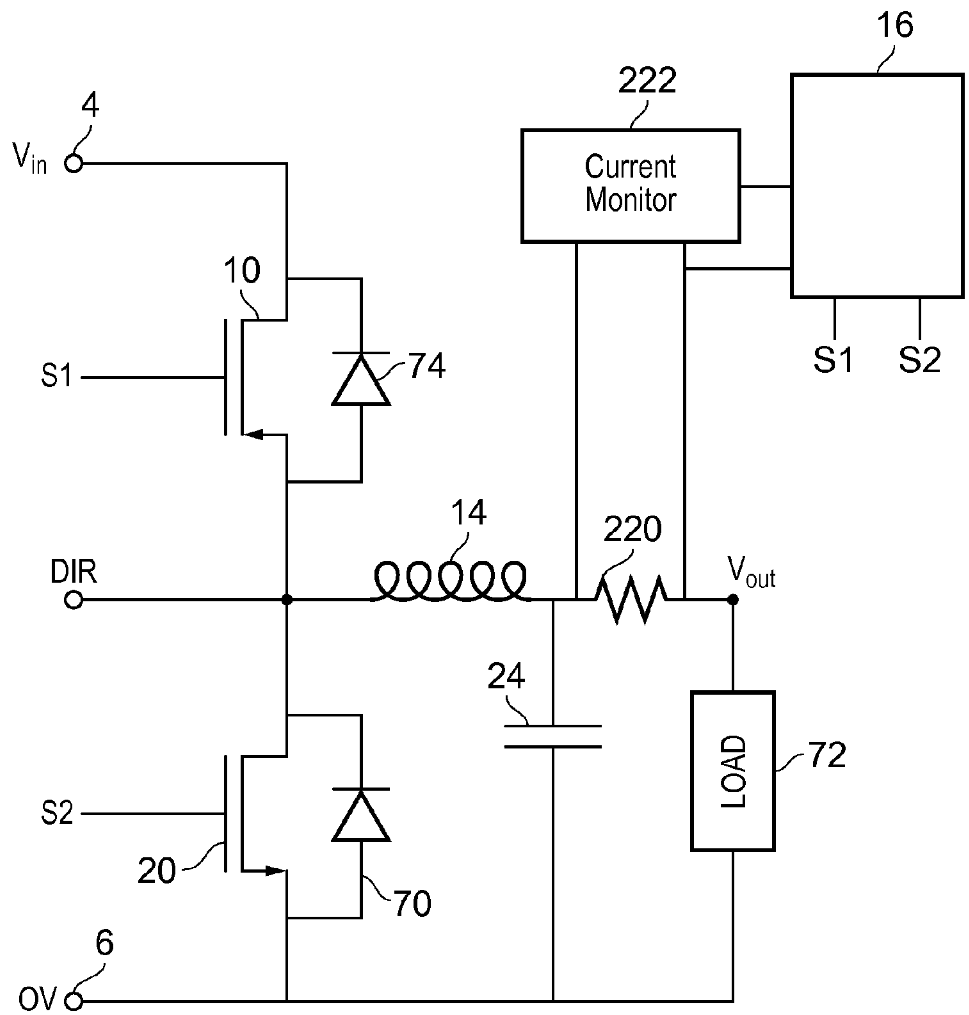
FIG. 14 shows a controller with a current measuring circuit for determining when low power mode should be entered.

In the embodiments described herein, the direction of current flow in the inductor has been used to determine when to switch between normal and low power modes. However, a current sensor to measure load current, such as a magnetic sensor or a series resistor, may be provided to measure the load current, and the switching between modes may be based on measured current values compared to transition thresholds, or even in response to signals from the load. FIG. 14 shows a modification to the arrangement of FIG. 4, where a current sensor 220, in the form of a current sensing resistor 220 is placed in series with the load 72 so as to measure the current to the load. This can be monitored by a current monitor 222 to signal to the controller when the low current mode should be entered.

It should also be noted that the boost and buck circuits can be combined around a single inductor 14 to provide a DC to DC converter which is operable in both buck and boost modes.

In the low power mode, the controller 16 commences with the switch on and off times which were pertaining during boost operation just prior to entering the low power mode and modifies the switch control times in accordance with the strategy described hereinbefore.

Figure 15A:
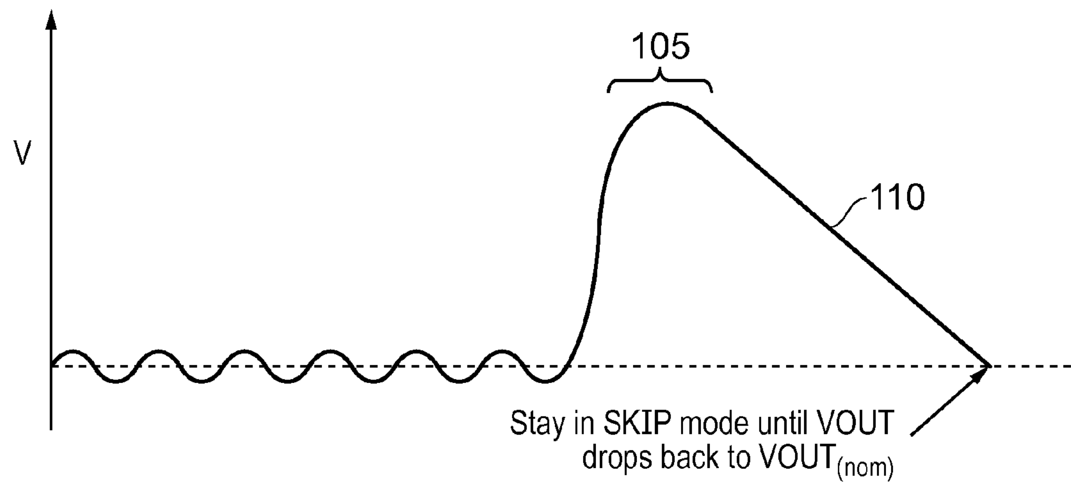
FIGS. 15*a* and 15*b* show a modified low power entry switching sequence.
Figure 15B:
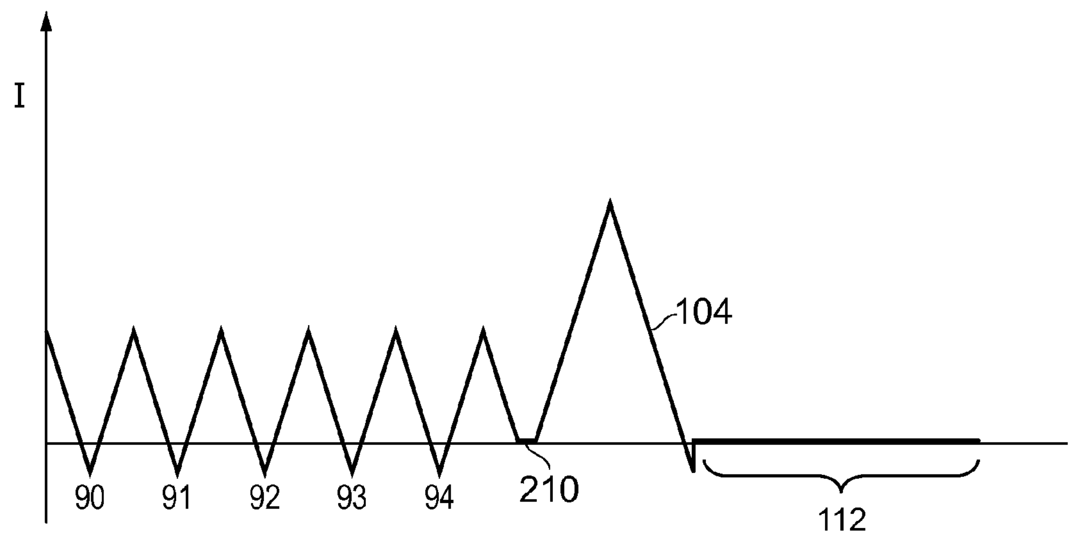

In variations of implementations of the embodiment, the switching sequences may be modified on entry into the power save mode. FIG. 15 presents the current and voltage graphs of FIG. 8, however the sequence of switch operations in the first mode have been slightly modified. Thus, the switches have been amended to include a preamble to the low power mode. Specifically, the operation of the low side switch 20 following value of P reaching 5 was modified, so as not to turn the low side switch on. This is shown by region 210 taking the place of negative region of 100 of FIG. 6. Similarly the value of S could also be varied during the initial cycle in low power mode, for example to cause the low side switch 20 of the buck converter to be switched off sooner than would otherwise be expected.

The claims presented herein have been written in single dependency format suitable for filing at the USPTO. However, if this document is used as the basis for a patent application outside of the USA, it is to be noted that any claim in a given category of claim may depend on, and is intended to depend on, any preceding claim in the same category unless this is clearly technically impossible.

The invention claimed is:

1. A controller for a DC to DC converter, the converter comprising a first electrically controlled switch in series connection with an inductor, wherein placing the first electrically controlled switch in a low impedance state causes a current flow in a first direction through the inductor to increase, and placing the first electrically controlled switch in a high impedance state causes the current flow in the first direction through the inductor to decrease, and wherein the controller is configured to operate the DC to DC converter in a first mode, and the controller is configured to operate the DC to DC converter in a low power mode, wherein the controller is configured to use information about a switching time of the first electrically controlled switch in the first mode to control a switching time of the first switch in the low power mode, and wherein the controller is configured to use a first switch on conduction time for which the first switch is conducting in a switching cycle of the DC to DC converter prior to entering the low power mode to determine a first switch on conduction time for which the first switch is conducting during a first switching cycle in the low power mode.

2. The controller of claim 1, wherein the controller is configured to multiply the first switch on conduction time for which the first switch is conducting in the switching cycle of the DC to DC converter prior to entering the low power mode by a coefficient to determine the first switch on conduction time for which the first switch is conducting during the first switching cycle in the low power mode.

3. The controller of claim 2, wherein the coefficient is greater than 1 and less than 10.

4. The controller of claim 2, wherein the first switch on conduction time for which the first switch is conducting during a first switching cycle in the low power mode is used as the time for which the first switch is conducting during at least a second switching cycle of the DC to DC converter in low power mode.

5. The controller of claim 1, wherein the controller is configured to enter low power mode when the current taken by the load is below a threshold value for a specified number of consecutive switching cycles in the first mode.

6. The controller of claim 1, wherein the controller is configured to cause the DC to DC converter to exit the power save mode and enter the first mode when the current drawn by the load exceeds a second current threshold.

7. The controller of claim 1, wherein the controller is configured to determine that the low power mode is to be exited when an output voltage reaches a voltage threshold within a low power mode exit period starting when, or at some time after, the first switch is switched into a high impedance state.

8. The controller of claim 1, wherein the first switch is connected between a first voltage input node and a common node, the second switch is connected between a second voltage input node and the common node, a first end of the inductor is connected to the common node, and a second end the inductor is connected to an output node.

9. The controller of claim 8, wherein the DC to DC converter is a buck converter.

10. The controller of claim 1, in which the converter further comprises a second electrically controlled switch, and when the second electrically controlled switch is in a low impedance state the current in the inductor is urged to flow in a second direction opposed to the first direction, and the second electrically controlled switch is responsive to the controller.

11. The controller of claim 10, wherein the converter is a buck converter, the first electrically controlled switch is connected between the first input voltage terminal and a first end of the inductor, and the second electrically controlled switch is connected between a second input voltage terminal and the first end of the inductor.

12. The controller of claim 10, wherein the converter is a boost converter, a first terminal of the inductor is connected to receive a first input voltage, a second end of the inductor is connected to a second supply voltage by way of the first electrically controlled switch, and the second end of the inductor is further connected to an output of the converter by way of the second electronically controlled switch.

13. The controller of claim 10, wherein the controller is configured to use a second switch conduction time for which the second switch is conducting in a switching cycle of the DC to DC converter prior to entering the low power mode to determine a second switch conduction time for which the second switch is conducting during a first switching cycle in the low power mode.

14. The controller of claim 10, wherein during the low power mode the controller is configured to monitor a direction or value of current flow in the inductor in a time frame at or around a time at which the second switch is switched from being conducting to being non conducting, and the controller is configured to use this to vary a switching parameter of a subsequent switching cycle in the low power mode.

15. The controller of claim 14, wherein the switching parameter includes one or more of the duration for which the second switch is conducting, or the duration for which the first switch is conducting.

16. The controller of claim 15, wherein if the current is flowing in the first direction, one or more of the duration for which the second switch is conducting is increased, or the duration for which the first switch is conducting is decreased.

17. The controller of claim 15, wherein if the current is flowing in a second direction opposed to the first direction, one or more of the duration for which the second switch is conducting is decreased, or the duration for which the first switch is conducting is increased.

18. The controller of claim 10, wherein the low power mode is a pulse skipping mode in which a control cycle comprises a sequence in which the first switch is on for a first time while the second switch is off, and then the second switch is on for a second switch on time while the first switch is off, and then the DC to DC converter is configured to hold both the first and second switch off until an end of the control cycle which is determined by an output voltage of the DC to DC converter reaching a voltage threshold value.

19. The controller of claim 10, wherein the controller is responsive to a voltage at a common node in the DC to DC converter to which the first switch, the second switch and the inductor are connected, and the controller is configured to determine that the converter should operate in the low power mode when the voltage at the common node just after the second switch is placed in a high impedance state is of opposite polarity to the voltage at the common node when the first switch is conducting.

20. A controller for a DC to DC converter, the converter comprising a first electrically controlled switch in series connection with an inductor, wherein placing the first electrically controlled switch in a low impedance state causes a current flow in a first direction through the inductor to increase, and placing the first electrically controlled switch in a high impedance state causes the current flow in the first direction through the inductor to decrease, wherein the controller is configured to operate the DC to DC converter in a first mode, and the controller is configured to operate the DC to DC converter in a low power mode, wherein the controller is configured to use information about a switching time of the first electrically controlled switch in the first mode to control a switching time of the first switch in the low power mode, and wherein the controller is configured to use a first switch non-conduction time for which the first switch is not conducting in a switching cycle of the DC to DC converter prior to entering the low power mode to determine a first switch non-conduction time for which the first switch is not conducting during a first switching cycle in the low power mode.

21. The controller of claim 20, and wherein the controller is configured to use a first switch non-conduction time for which the first switch is not conducting in a switching cycle of the DC to DC converter prior to entering the low power mode to determine a time period for which the second switch is conducting.

22. A method of operating a DC to DC converter, the converter comprising a first electrically controlled switch, and an inductor, and wherein placing the first electrically controlled switch in a low impedance state causes a current flow in a first direction through the inductor to increase, and placing the first electrically controlled switch in a high impedance state causes the current flow in the first direction through the inductor to decrease, wherein the DC to DC converter is operated in a first mode when a current taken by a load supplied by the DC to DC converter is above a first current threshold, and the DC to DC converter is operated in a low power mode when the current taken by the load is below the first current threshold, wherein information about a switching time of the first electrically controlled switch in the first mode is used to control a switching time of the first switch in the low power mode, and wherein a first switch conduction time for which the first switch is conducting in a switching cycle of the DC to DC converter prior to entering the low power mode is used to determine a first switch on conduction time for which the first switch is conducting during a first switching cycle in the low power mode.

23. A method as claimed in claim 22, wherein the first switch conduction time for which the first switch is conducting during a first switching cycle in the low power mode is used as the time for which the first switch is conducting during at least a second switching cycle of the DC to DC converter in low power mode.

24. A method as claimed in claim 22, wherein a first switch non-conduction time for which the first switch is not conducting in a switching cycle of the DC to DC converter prior to entering the low power mode, is used to determine a first switch non-conduction time for which the first switch is not conducting during a first switching cycle in the low power mode.

25. A method as claimed in claim 24, wherein the converter includes a second switch which when in a low impedance state causes the current flow in the first direction to decrease, and the second switch is conducting for a duration corresponding to the non-conduction time of the first switch in the low power mode.

26. A method as claimed in claim 22, wherein the converter includes a second switch and placing the second switch in a low impedance state causes the current flow in the first direction to decrease and a second switch conduction time for which the second switch is conducting in a switching cycle of the DC to DC converter prior to entering the low power mode is used to determine a second switch conduction time for which the second switch is conducting during a first switching cycle in the low power mode.

27. A method as claimed in claim 26, further comprising monitoring a direction or value of current flow in the inductor in a time frame at or around a time at which the second switch is switched from being conducting to being non conducting, and using this to vary a switching parameter of a subsequent switching cycle in the low power mode.

28. A method as claimed in claim 27, in which wherein the switching parameter is one or more of the duration for which the second switch is conducting, or for which the first switch is conducting.

29. A method as claimed in claim 28, wherein if the current is flowing in the first direction, one or more of the duration for which the second switch is conducting is increased, or the duration for which the first switch is conducting is decreased.

30. A method as claimed in claim 28, wherein if the current is flowing in a second direction opposed to the first direction, one or more of the duration for which the second switch is conducting is decreased, or the duration for which the first switch is conducting is decreased.

* * * * *